United States Patent Office

3,379,793
Patented Apr. 23, 1968

3,379,793
SOLID HOMOPOLYMERS AND COPOLYMERS OF HALOGEN - SUBSTITUTED OLEFINS AND A PROCESS FOR THE PREPARATION OF THE SAME
Edmund B. Davidson, Elizabeth, N.J., assignor to Esso Research and Engineering Company, a corporation of Delaware
No Drawing. Filed Nov. 1, 1963, Ser. No. 320,931
6 Claims. (Cl. 260—87.5)

ABSTRACT OF THE DISCLOSURE

Solid homo and copolymers of halogen-containing allylic olefins are produced by polymerization in the presence of Friedel-Crafts catalysts at temperatures in excess of 100° C.

The present invention relates to homopolymers and copolymers of halogen-containing allylic olefins and a high temperature process for their formation.

High molecular weight solid polymers of halogen-containing allylic olefins are in general difficult to obtain utilizing an ionic type of polymerization mechanism at relatively high temperatures. Various methods have been proposed for the polymerization of olefins containing allylic halogen. For example U.S. 3,058,966 describes the polymerization and copolymerization of 3,4-dichloro-1-butene with a typical Ziegler catalyst system; however, the resulting polymer must be deashed prior to effective use. Additionally, U.S. 2,562,090 discloses that halogenated butenes can be polymerized by means of an alkali metal, such as sodium. This mode of operation is not entirely satisfactory because the resulting polymer formed by the condensation reaction has a very low halogen content. Finally, U.S. 2,626,252 defines a free radical copolymerization method of halogenated olefins. The allylic olefins of the present invention are normally not particularly useful in free radical copolymerization as the reaction usually terminates at a degree of polymerization in the vicinity of 6 to 15 monomer units.

The present invention resides in the discovery that allylic halogen-containing olefins having the general formulae:

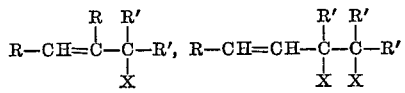

and

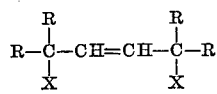

where R is an alkyl group having from 1 to 4 carbon atoms or hydrogen, R' is hydrogen or an alkyl group having from 1 to 20 carbon atoms, more preferably 1 to 6 carbon atoms, and X is a halogen atom, preferably Cl or Br, are homopolymerized and copolymerized with the aid of Friedel-Crafts catalyst at temperatures in the range of from about 100° to 225° C., thereby obtaining a high molecular weight, solid product.

It is surprising that solid products of halogen-containing allylic olefins are obtained by carrying out the polymerization reaction at elevated temperatures in view of the fact that in most ionic polymerization systems, elevation of the polymerization reaction temperature leads to the formation of lower molecular weight products, whereas lowering the temperature produces higher molecular weight products.

The polymer products of the present invention are useful in the preparation of flame-resistant plastics, elastomers and greases. The polymers of the present invention are particularly useful for molded articles such as battery covers, tank linings, and cable insulation.

Specifically, it has been found that substituted straight or branched chain mono-olefins having from 3 to 18 carbon atoms and more preferably 3 to 12 carbon atoms and at least one allylic halogen such as for example allyl chloride, methallyl chloride, 3,4-dichloro-1-butene, and 1,4-dichloro-2-butene are readily polymerized to form solid materials having high softening point properties. The polymerization of halogen-containing allylic olefins is advantageously carried out in the presence of an inert liquid reaction medium. Preferred reaction media are those solvents which are normally employed in cationic polymerization reactions, such as aliphatic hydrocarbons and halogenated hydrocarbon solvents. While aliphatic solvents having a carbon number from $C_2$ to $C_{20}$ can be employed as inert diluents, it is generally best to use hydrocarbon diluents having a carbon number from $C_6$ to $C_{10}$ for example n-hexane, cyclohexane, isooctane, n-decane, etc., are preferred. Halogenated hydrocarbons such as methylene chloride, ethylene dichloride, and propyl chloride serve well as reaction diluents in the present polymerization process.

In some cases, the polymerization can be carried out in the absence of an inert liquid reaction medium, e.g. when the monomer or a mixture of monomers can be used as the polymerization medium.

Similarly, the polymerization reaction can be carried out under a blanket of an inert gaseous medium. Materials such as nitrogen, helium, gaseous aliphatic hydrocarbons, e.g. methane and ethane, and low molecular weight halogenated hydrocarbons, e.g. methyl chloride, can be used for this purpose.

Any Friedel-Crafts type catalyst can be used in the process of the present invention. For example, $SnCl_4$, $TiCl_4$, $BF_3$, $FeCl_3$, can be employed; however, aluminum halide compounds, such as for example $AlCl_3$, $AlBr_3$, ethyl aluminum dichloride and diethyl aluminum chloride, are preferred. The catalysts described herein can be employed in a dissolved or finely dispersed form. As a catalyst dispersion medium any inert material may be used which is liquid under the pressure or the temperature employed in the polymerization reaction. Aliphatic hydrocarbons and halogenated aliphatic hydrocarbon materials which are also employed as reaction diluents are preferred for use as catalyst dispersion mediums.

By the process of the present invention, the monomer or mixture of monomers is contacted with a Friedel-Crafts catalyst with or without the presence of an inert reaction medium. To obtain products having high softening points, the polymerization is conveniently effected at temperatures in the range of from about 100° to 225° C., usually 100° to 200° C., and more preferably from 100° to 150° C., and pressures in the range of from about atmospheric pressure to 100 p.s.i.g. Reaction zone pressure is not a critical feature of the present invention. The pressure in the reaction zone is often that generated by the reactants and/or solvents at the polymerization temperature. The catalyst concentration in the polymerization zone can range from 0.005 to 15 mole percent but is preferably in the range of about 0.5 to 10 mole percent, based on total liquid, and the polymer product concentration in the polymerization zone is preferably kept between 1 to 5 wt. percent based on total content of the zone so as to allow easy handling of the polymerized mixture. The proper polymer concentration can be obtained by having a sufficient quantity of the inert diluent present within the reaction zone or by stopping the polymerization short of 100% conversion. When the desired degree of polymerization has been reached, a lower alkanol such as methanol, ethanol, isopropanol, etc., is normally added to the reaction mixture for the purpose of partially dissolving and deactivating the catalyst and precipitating the polymer product from the solution. To form the desired high molecular weight polymers of the present invention, reaction times ranging from 15 minutes to 24 hours are normally employed.

The homopolymers and copolymers thus produced have an average molecular weight in the range of 1000 to about 10,000 as determined by vapor pressure osmometry. The melting points of the polymer products vary in the range from 65 to >300° C. and more usually in the range from 75 to 245° C. It has been found that as the temperature of polymerization increases, a product having a higher softening point is obtained and a higher yield is also secured. Additionally, as the polymerization temperature increases, the number of halogen units remaining in the polymer decrease. As the temperature of polymerization increases above 225° C., a new semi-conducting material is obtained resulting from the extensive dehydrohalogenation of the polymer formed. It should be understood that while the present invention is directed to the formation of polymers having high softening points, low softening point polymer greases can be prepared by conducting the polymerization at temperatures ranging from 20° to 65° C.

This invention and its advantages will be better understood by reference to the following examples:

Example 1.—Homopolymer of methallyl chloride

Into a glass reaction vessel equipped with a reflux condenser, inlet and outlet valves and stirring means, was charged, under a blanket of nitrogen, 25 milliliters of methallyl chloride mixed with 25 milliliters of normal heptane. A catalyst mixture consisting of 1.5 grams of aluminum bromide in 25 milliliters of normal heptane was added dropwise to the methallyl chloride solution at room temperature. An immediate exothermic reaction producing a brown solution was obtained upon initial catalyst addition. Solution color gradually deepened to a black color upon further addition of the catalyst mixture. The reaction mixture was refluxed at a temperature of 100° C. for a period of 8 hours, whereupon the solution was cooled and poured into excess methanol. The resulting precipitated polymer was filtered, washed and dried for further testing. The weight of the solid white polymer was approximately 0.5 gram and was found to have a softening point of about 90° to 92° C.

Example 2.—Homopolymer of 1,4-dichloro-2-butene

Into the reaction apparatus of Example 1 was charged, under a blanket of nitrogen, 15 milliliters of 1,4-dichloro-2-butene. A catalyst mixture consisting of 1 gram of aluminum bromide in 25 milliliters of normal heptane was added dropwise to the monomer contained in the reaction vessel. Immediately upon addition of the catalyst mixture, heat and a dark brown color were produced. The reaction mixture was heated with stirring until a temperature of 100° C. was obtained and was then cooled and poured into excess methanol. The resulting precipitated polymer was filtered, washed, and dried. The weight of the solid, brown polymer was approximately 0.9 gram, and was found to have a softening point of about 205 to 215° C.

Example 3.—Homopolymer of 3,4-dichloro-1-butene

Into the apparatus of FIGURE 1 was introduced, under a blanket of nitrogen, 15 milliliters of 3,4-dichloro-1-butene in 25 milliliters of normal heptane. A catalyst mixture of 1 gram of aluminum bromide in 25 milliliters of normal heptane was added dropwise to the monomer solution at room temperature and a vigorous reaction ensued with the production of a deep brown color. The reaction mixture was heated to a temperature of 100° C., cooled, and poured into excess methanol. The resulting polymer after filtering, washing and drying was a brown solid which weighed approximately 1.1 grams and was partially soluble in carbon tetrachloride and acetone. The carbon tetrachloride soluble portion which amounted to 75 wt. percent of the initial polymer product had a softening point in the range of from about 107° to 115° C. The acetone soluble portion which made up the remainder of the original polymer product had a softening point of about 230° to 245° C.

Example 4.—Copolymer of 3,4-dichloro-1-butene and 1,4-dichloro-2-butene

Into the reaction apparatus of Example 1 was introduced, under a blanket of nitrogen, 7.5 milliliters of 3,4-dichloro-1-butene and 7.5 milliliters of 1,4-dichloro-2-butene in 20 milliliters of normal heptane. A catalyst mixture consisting of 1.6 grams of aluminum bromide and 25 milliliters of normal heptane was introduced dropwise into the mixture of monomers contained in the reaction vessel. The reaction mixture was heated to a temperature of 100° C., cooled, and poured into excess methanol. The resulting precipitated polymer after filtering, washing and drying weighed 1 gram and was found to be partially soluble in carbon tetrachloride and acetone. The portion of polymer which was soluble in carbon tetrachloride constituted 50 wt. percent of the original polymer product and had a softening point ranging from 97° to 108° C. The remainder of the polymer product which was soluble in acetone had a softening point of about 149° to 156° C.

Example 5.—Copolymer of 1,4-dichloro-2-butene and allyl chloride

Into a stainless steel glass lined pressure vessel was charged, under a blanket of nitrogen, 20 milliliters of allyl chloride, 5 milliliters of 1,4-dichloro-2-butene and 1 gram of aluminum bromide. The reaction vessel was then pressured to 200 p.s.i. with nitrogen and heated at 150° C. for 12 hours. The pressure vessel was then cooled to room temperature and its contents poured into excess methanol. The resulting polymer after filtering, washing, and drying weighed 1 gram and was found to be partially soluble in carbon tetrachloride and acetone. The portion of polymer product soluble in carbon tetrachloride constituted 75 wt. percent of the total polymer product and had a softening point of 90° C. The remaining portion of the original polymer product which was soluble in acetone was found to have a softening point of 128° C.

Example 6

Runs were conducted to determine the effect of polymerization temperature on yield and polymer properties. In tests carried out at temperatures below 100° C., the reaction apparatus was similar to that described in Example 1. In runs conducted at temperatures of 100° C. or more, the reaction apparatus of Example 5 was employed. In every instance, solvent was not used in the reaction and excess methanol was used to kill the catalyst and precipitate the polymer product. The softening points of the polymer products were determined utilizing a polarized, hot stage, melting point apparatus. The softening point being defined is that point at which the edges of the polymer began to melt. The results of the tests are enumerated in the table listed below:

1,4-dichloro-2-butene and 3,4-dichloro-1-butene with 1,4-dichloro-2-butene in the presence of a Friedel-Crafts catalyst at an elevated temperature in excess of 100° C., and recovering a solid polymer of said monomers having an average molecular weight as determined by vapor

TABLE I

| Run No. | Monomer | Monomer Conc. (ml.) | Catalyst | Catalyst Conc. (g./ml.) | Reaction Temp., ° C. | Reaction Time (hrs.) | Softening Point (solid portion) °C. |
|---|---|---|---|---|---|---|---|
| 1 | Allyl Chloride | 100 | TiCl⁴ | 0.017 | 150 | 12 | 180–185 |
| 2 | do | 50 | TiCl⁴ | 0.034 | 25 | 24 | (²) |
| 3 | do | 100 | SnCl⁴ | 0.022 | 150 | 12 | 180–185 |
| 4 | do | 50 | SnCl⁴ | 0.044 | 25 | 24 | (²) |
| 5 | do | 100 | AlCl³ | 0.010 | 150 | 12 | 77–85 |
| 6 | do | 100 | AlCl³ | 0.010 | 25 | 24 | 60–65 |
| 7 | Ally Bromide | 100 | AlBr³ | 0.010 | 150 | 12 | 130–138 |
| 8 | Allyl Chloride | 100 | AlBr³ | 0.010 | 25 | 24 | 60–67 |
| 9¹ | do | 100 | AlBr³ | 0.010 | 100 | 12 | 69 |
| 10¹ | do | 100 | AlBr³ | 0.010 | 125 | 12 | 104 |
| 11¹ | do | 100 | AlBr³ | 0.010 | 135 | 12 | 86 |
| 12¹ | do | 100 | AlBr³ | 0.010 | 150 | 12 | 123 |
| 13¹ | do | 100 | AlBr³ | 0.010 | 175 | 12 | 172 |
| 14¹ | do | 100 | AlBr³ | 0.010 | 200 | 12 | 165 |
| 15¹ | do | 100 | AlBr³ | 0.010 | 225 | 12 | 225 |
| 16 | do | 100 | EtAlCl₂ | 0.012 | 25 | 24 | ³ 128–135 |
| 17 | do | 50 | FeCl³ | 0.020 | 25 | 24 | (⁴) |
| 18 | do | 100 | Et₂AlCl | 0.009 | 25 | 24 | (⁴) |

¹ Bomb pressurized to 200 p.s.i.g. with N₂.
² No solid polymer.
³ Small amount polymer formed.
⁴ Trace solid.

Reviewing the data listed in Table I above, it can be readily observed from runs 1 to 8 that it is necessary to conduct the polymerization of olefins containing allylic halogen at elevated temperatures if products having high softening points are desired. At low reaction temperatures, solid polymer is not formed or if solid is formed its softening point is substantially below that formed at higher reaction temperatures. Runs 9 to 15 illustrate that the softening points of polymers of allylic olefins generally increase with increasing polymerization reaction temperature. Runs 16 to 18 illustrate the applicability of ethyl aluminum chloride, diethyl aluminum chloride and ferric chloride as polymerization catalysts for allylic halogen containing olefins even though only small amounts of polymer were formed at the low temperature polymerization conditions.

The advantages of this invention will be apparent to those skilled in the art. Polymers of halogen containing allylic olefins that exhibit high softening point properties can be directly prepared by the process of the present invention. It is to be understood that this invention is not limited to the specific examples set forth herein which have been offered merely as illustrations and that modifications may be made without departing from the spirit and scope of the appended claims.

What is claimed is:

1. A process for the formation of solid homopolymers by polymerization a halogenated olefin monomer selected from the group consisting of 1,4-dichloro-2-butene and 3,4-dichloro-1-butene, in the presence of a Friedel-Crafts catalyst at an elevated temperature in excess of 100° C., and recovering a solid polymer of said olefins having an average molecular weight as determined by vapor pressure osmometry of from 1,000 to 10,000 and a melting point varying from about 65° to about 300° C.

2. The process of claim 1 wherein the catalyst is an aluminum halide compound.

3. A process for the formation of solid copolymers comprising copolymerizing halogenated olefin monomers selected from the group consisting of allyl chloride with pressure osmometry of from 1,000 to 10,000 and a melting point varying from about 65° to about 300° C.

4. The process of claim 3 wherein the catalyst is an aluminum halide compound.

5. Copolymer of 3,4-dichloro-1-butene with 1,4-dichloro-2-butene, said copolymer produced by copolymerizing said monomers at an elevated temperature in excess of 100° C. and in the presence of a Friedel-Crafts catalyst having a fraction soluble in carbon tetrachloride and another fraction soluble in acetone, said carbon tetrachloride soluble fraction having a softening point varying from 97° to 108° C. and said acetone soluble fraction having a softening point ranging from 149° to about 156° C.

6. The copolymer of allyl chloride with 1,4-dichloro-2-butene, said copolymer produced by copolymerizing said monomers at an elevated temperature in excess of 100° C. and in the presence of a Friedel-Crafts catalyst having a fraction soluble in carbon tetrachloride and another fraction soluble in acetone, said carbon tetrachloride soluble fraction having a softening point of about 90° C. and said acetone soluble fraction having a softening point of about 128° C.

References Cited

UNITED STATES PATENTS

| 2,426,913 | 9/1947 | Adelson et al. | 260—91.7 |
| 2,562,090 | 7/1957 | Frey et al. | 260—91.7 |
| 3,058,966 | 10/1962 | Seelback et al. | 260—91.7 XR |
| 3,084,144 | 4/1963 | Crawford | 260—87.7 |
| 3,245,969 | 4/1966 | Reding et al. | 260—91.7 |

FOREIGN PATENTS

| 876,123 | 10/1942 | France. |
| 430,298 | 6/1935 | Great Britain. |
| 515,263 | 11/1939 | Great Britain. |

JOSEPH L. SCHOFER, *Primary Examiner.*

J. A. DONAHUE, M. L. BERCH, *Assistant Examiners.*